(12) United States Patent
Furuyama et al.

(10) Patent No.: US 10,826,092 B2
(45) Date of Patent: Nov. 3, 2020

(54) METHOD FOR OPERATING FUEL CELL VEHICLE

(71) Applicant: HONDA MOTOR CO., LTD., Tokyo (JP)

(72) Inventors: Masataka Furuyama, Wako (JP); Keiko Yamazaki, Wako (JP); Atsushi Kamachi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 326 days.

(21) Appl. No.: 15/653,531

(22) Filed: Jul. 19, 2017

(65) Prior Publication Data
US 2018/0026283 A1 Jan. 25, 2018

(30) Foreign Application Priority Data
Jul. 19, 2016 (JP) .................................. 2016-141455

(51) Int. Cl.
*H01M 8/04537* (2016.01)
*H01M 16/00* (2006.01)
(Continued)

(52) U.S. Cl.
CPC ......... *H01M 8/04559* (2013.01); *B60L 58/40* (2019.02); *H01M 8/0488* (2013.01); *H01M 8/0494* (2013.01); *H01M 8/04567* (2013.01); *H01M 8/04947* (2013.01); *H01M 16/006* (2013.01); *H01M 2250/20* (2013.01); *Y02T 90/32* (2013.01)

(58) Field of Classification Search
CPC . B60L 58/40; H01M 16/006; H01M 2250/20; H01M 8/04559; H01M 8/04567; H01M 8/0488; H01M 8/0494; H01M 8/04947
See application file for complete search history.

(56) References Cited

U.S. PATENT DOCUMENTS 4,883,724 A * 11/1989 Yamamoto .............. B60L 58/30
429/431
2012/0225329 A1 9/2012 Kazuno et al.
(Continued)

FOREIGN PATENT DOCUMENTS

JP 4978019 B2 8/2007
JP 2007220323 A * 8/2007 .............. H01M 8/10
JP 2013-062153 4/2013

OTHER PUBLICATIONS

Machine Translation JP2007220323(A) (Year: 2007).*
Japanese Office Action for corresponding JP Application No. 2016-141455, dated Nov. 14, 2017.

*Primary Examiner* — Victoria H Lynch
(74) *Attorney, Agent, or Firm* — Mori & Ward, LLP

(57) ABSTRACT

A method for operating a fuel cell vehicle includes supplying electric power to a vehicle drive motor from at least one of a fuel cell and a battery. It is determined whether an electric potential of electric power output from the fuel cell is within a deterioration acceleration region in which the fuel cell is deteriorated due to a platinum oxidation-reduction reaction. The fuel cell is controlled in a deterioration suppressing mode when the electric potential is within the deterioration acceleration region in a state where the fuel cell and the battery supply electric power to the vehicle drive motor.

6 Claims, 7 Drawing Sheets

(51) Int. Cl.
*H01M 8/04828* (2016.01)
*H01M 8/04858* (2016.01)
*B60L 58/40* (2019.01)

(56) References Cited

U.S. PATENT DOCUMENTS

| | | |
|---|---|---|
| 2012/0321917 A1 | 12/2012 | Kazuno et al. |
| 2013/0065090 A1* | 3/2013 | Kazuno ............... H01M 8/0488 429/9 |
| 2013/0288148 A1 | 10/2013 | Kazuno et al. |

* cited by examiner

METHOD FOR OPERATING FUEL CELL VEHICLE

CROSS-REFERENCE TO RELATED APPLICATIONS

The present application claims priority under 35 U.S.C. § 119 to Japanese Patent Application No. 2016-141455, filed Jul. 19, 2016, entitled "Method for Operating Fuel Cell Vehicle." The contents of this application are incorporated herein by reference in their entirety.

BACKGROUND

1. Field

The present disclosure relates to a method for operating a fuel cell vehicle.

2. Description of the Related Art

For example, a solid polymer electrolyte fuel cell includes a membrane electrode assembly (MEA) in which an anode electrode is disposed on one surface of an electrolyte membrane, which is a solid polymer ion-exchange membrane, and a cathode electrode is disposed on the other surface of the electrolyte membrane. The membrane electrode assembly and separators, sandwiching the membrane electrode assembly, constitute a power generation cell (unit cell). Typically, a predetermined number of power generation cells are stacked and, for example, mounted as a vehicle fuel cell stack in a fuel cell vehicle (such as a fuel cell electric automobile).

In the electrodes (anode and cathode electrodes) of the power generation cell, depending on electric potential conditions during power generation, the state of an electrode catalyst (for example, platinum) may repeatedly change between an oxidation state and a reduction state. Therefore, there is a problem in that the electrode catalyst tends to dissolve and the durability of the electrode catalyst decreases.

For example, Japanese Patent No. 4978019 describes a fuel cell system for addressing the problem. In the fuel cell system, when the state-of-charge (SOC) of a secondary battery is comparatively high, the output power of the fuel cell is limited so that the voltage of the fuel cell becomes higher than a predetermined voltage. If the SOC of the secondary battery becomes low, the limitation on the output power of the fuel cell is removed, and the output power of the fuel cell is controlled in accordance with electric power required by a motor.

SUMMARY

According to a first aspect of the present invention, a method for operating a fuel cell vehicle including a vehicle drive motor to which electric power is supplied from a fuel cell and a battery includes controlling electric power extracted from the fuel cell when an output electric potential of the fuel cell enters a deterioration acceleration region in a state in which electric power is supplied from the fuel cell and the battery to the vehicle drive motor, the deterioration acceleration region being a voltage region in which deterioration of the fuel cell is accelerated due to a platinum oxidation-reduction reaction.

According to a second aspect of the present invention, a method for operating a fuel cell vehicle including a vehicle drive motor to which electric power is supplied from a fuel cell and a battery includes maintaining an output electric potential of the fuel cell at a constant value near an upper limit of a deterioration acceleration region or at a constant value near a lower limit of the deterioration acceleration region when increasing or decreasing electric power extracted the fuel cell in a state in which electric power is supplied from the fuel cell and the battery to the vehicle drive motor, the deterioration acceleration region being a voltage region in which deterioration of the fuel cell is accelerated due to a platinum oxidation-reduction reaction.

According to a third aspect of the present invention, a method for operating a fuel cell vehicle includes supplying electric power to a vehicle drive motor from at least one of a fuel cell and a battery. It is determined whether an electric potential of electric power output from the fuel cell is within a deterioration acceleration region in which the fuel cell is deteriorated due to a platinum oxidation-reduction reaction. The fuel cell is controlled in a deterioration suppressing mode when the electric potential is within the deterioration acceleration region in a state where the fuel cell and the battery supply electric power to the vehicle drive motor.

According to a fourth aspect of the present invention, a method for operating a fuel cell vehicle includes supplying electric power to a vehicle drive motor from at least one of a fuel cell and a battery. An electric potential of electric power output from the fuel cell is maintained at a constant value near an upper limit of a deterioration acceleration region or at a constant value near a lower limit of the deterioration acceleration region when changing electric power output from the fuel cell in a state where the fuel cell and the battery supply electric power to the vehicle drive motor. The deterioration acceleration region is a voltage region in which the fuel cell is deteriorated due to a platinum oxidation-reduction reaction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
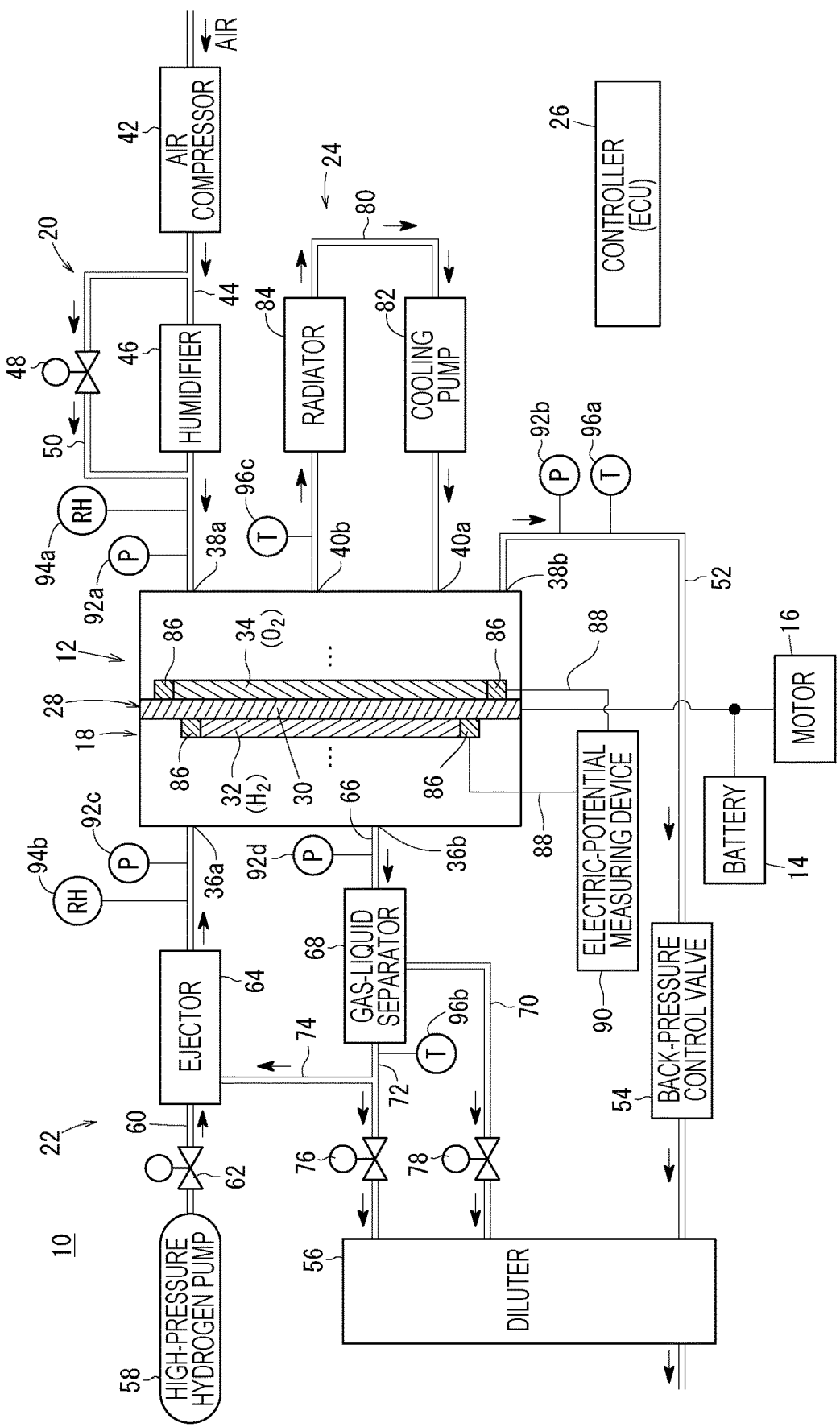
FIG. 1 is a schematic block diagram of a fuel cell vehicle to which an operation method according to an embodiment of the present disclosure is applied.

The embodiments will now be described with reference to the accompanying drawings, wherein like reference numerals designate corresponding or identical elements throughout the various drawings.

FIG. 1 illustrates a fuel cell vehicle 10 to which an operation method according to an embodiment of the present disclosure is applied. The fuel cell vehicle 10 is, for example, a fuel cell electric automobile. The fuel cell vehicle 10 includes a fuel cell system 12, a battery 14, and a motor (vehicle drive motor) 16. The battery 14 includes a secondary battery, a capacitor, and the like.

The fuel cell system 12 includes a fuel cell stack 18, an oxidant gas supply device 20, a fuel gas supply device 22, a coolant supply device 24, and a controller 26. The oxidant gas supply device 20 supplies an oxidant gas to the fuel cell stack 18, the fuel gas supply device 22 supplies a fuel gas to the fuel cell stack 18, and the coolant supply device 24 supplies a coolant to the fuel cell stack 18. The controller 26 controls the entirety of the fuel cell system 12.

The fuel cell stack 18 includes a stack of power generation cells 28. Each of the power generation cells 28 includes an MEA that includes a solid polymer electrolyte membrane 30 and an anode electrode 32 and a cathode electrode 34 sandwiching the solid polymer electrolyte membrane 30. The solid polymer electrolyte membrane 30 is, for example, a perfluorosulfonic acid membrane including water. Instead of the fluoropolymer electrolyte, a hydrocarbon (HC) electrolyte may be used for the solid polymer electrolyte membrane 30. The output power (electric power) of the fuel cell stack 18 is supplied to the motor 16 and can be used to charge the battery 14. The output power (electric power) of the battery 14 is supplied to the motor 16.

The fuel cell stack 18 includes a fuel gas inlet manifold 36a and a fuel gas outlet manifold 36b through which a fuel gas (for example, hydrogen gas) is supplied to the anode electrodes 32. The fuel cell stack 18 includes an oxidant gas inlet manifold 38a and an oxidant gas outlet manifold 38b through which an oxidant gas (for example, air) is supplied to the cathode electrodes 34. The fuel cell stack 18 includes a coolant inlet manifold 40a and a coolant outlet manifold 40b through which a coolant flows to the power generation cells 28.

The oxidant gas supply device 20 includes an air compressor (air pump) 42 for compressing air taken from the outside and supplying the air. The air compressor 42 is disposed in an air supply channel 44. In the air supply channel 44, a humidifier 46 and a bypass channel 50, which bypasses the humidifier 46 via a valve 48, are disposed. The air supply channel 44 is connected to the oxidant gas inlet manifold 38a of the fuel cell stack 18. An air discharge channel 52 is connected to the oxidant gas outlet manifold 38b. In the air discharge channel 52, a back-pressure control valve 54 is disposed, and a diluter 56 is connected to a position downstream of the back-pressure control valve 54.

The fuel gas supply device 22 includes a high-pressure hydrogen tank 58 for storing high-pressure hydrogen. The high-pressure hydrogen tank 58 is connected to the fuel gas inlet manifold 36a of the fuel cell stack 18 via a hydrogen supply channel 60. In the hydrogen supply channel 60, a valve 62 for pressure adjustment and an ejector 64 are arranged in a direction in which hydrogen gas flows.

An off-gas channel 66 is connected to the fuel gas outlet manifold 36b of the fuel cell stack 18. The off-gas channel 66 is connected to a gas-liquid separator 68. A drain channel 70, for discharging liquid components, and a gas channel 72, for discharging gas components, are connected to the gas-liquid separator 68. The gas channel 72 is connected to the ejector 64 via a circulation path 74. When a purge valve 76 is open, the gas channel 72 communicates with the diluter 56. The drain channel 70 is connected to the diluter 56 via a valve 78.

The diluter 56 has a function of reducing hydrogen concentration to a value that is lower than or equal to a predetermined value by mixing an off-gas (including hydrogen gas) discharged from the fuel gas outlet manifold 36b of the fuel cell stack 18 with an off-gas (including oxygen) discharged from the oxidant gas outlet manifold 38b of the fuel cell stack 18.

The coolant supply device 24 includes a coolant circulation path 80 that is connected to the coolant inlet manifold 40a and the coolant outlet manifold 40b of the fuel cell stack 18. The coolant is supplied to the fuel cell stack 18 through the coolant circulation path 80 in a circulating manner. A cooling pump 82 is disposed in a part of the coolant circulation path 80 near the coolant inlet manifold 40a. A radiator 84 is disposed in a part of the coolant outlet manifold 40b near the coolant outlet manifold 40b.

The power generation cell 28 includes a predetermined number of electric potential sensors 86. One end of a conducting line 88 is connected to each of the electric potential sensors 86, and the other end of the conducting line 88 is connected to an electric potential measuring device 90. A conducting line (not shown) connected to a reference electrode is connected to the electric potential measuring device 90. An electric potential measured by the electric potential measuring device 90 is input to the controller 26. The electric potential measuring device 90 may measure the electric potential of the stack of power generation cells 28.

Pressure gauges 92a, 92b, 92c, and 92d are respectively disposed in the air supply channel 44, the air discharge channel 52, the hydrogen supply channel 60, and the off-gas channel 66. Hygrometers 94a and 94b are respectively disposed in the air supply channel 44 and the hydrogen supply channel 60. Thermometers 96a, 96b, and 96c are respectively disposed in the air discharge channel 52, the gas channel 72, and the coolant circulation path 80.

An operation of the fuel cell vehicle 10, structured as described above, will be described below.

Air (oxidant gas) is supplied to the air supply channel 44 by using the air compressor 42 of the oxidant gas supply device 20. The air flows through the humidifier 46 to be humidified or flows through the bypass channel 50 to bypass the humidifier 46. Then, the air is supplied to the oxidant gas inlet manifold 38a of the fuel cell stack 18.

In the fuel gas supply device 22, the valve 62 is opened to supply hydrogen gas (fuel gas) from the high-pressure hydrogen tank 58 to the hydrogen supply channel 60. The hydrogen gas flows through the ejector 64 and is supplied to the fuel gas inlet manifold 36a of the fuel cell stack 18.

In the coolant supply device 24, the cooling pump 82 is operated to supply a coolant, such as pure water, ethylene glycol, or oil, from the coolant circulation path 80 to the coolant inlet manifold 40a of the fuel cell stack 18.

The air is supplied from the oxidant gas inlet manifold 38a to the cathode electrode 34 of each power generation cell 28. The hydrogen gas is supplied from the fuel gas inlet manifold 36a to the anode electrode 32 of each power generation cell 28. Accordingly, in each power generation cell 28, the air supplied to the cathode electrode 34 and the hydrogen gas supplied to the anode electrode 32 are consumed by causing an electrochemical reaction, thereby generating electric power.

Next, the air supplied to the cathode electrode 34 and consumed is discharged to the oxidant gas outlet manifold 38b, flows through the air discharge channel 52, and flows into the diluter 56. Likewise, the hydrogen gas supplied to the anode electrode 32 and consumed is discharged to the fuel gas outlet manifold 36b as an off-gas (partially-consumed fuel gas). The off-gas flows through the off-gas channel 66 into the gas-liquid separator 68, which removes liquid water from the off-gas. Then, the off-gas flows through the gas channel 72 and the circulation path 74 and is sucked into the ejector 64.

The coolant supplied to the coolant inlet manifold 40a cools each power generation cell 28. Then, the coolant is discharged from the coolant outlet manifold 40b. The coolant flows through the coolant circulation path 80 and is cooled by the radiator 84. Then, the cooling pump 82 pumps and supplies the coolant to the fuel cell stack 18 in a circulating manner.

Next, an operation method according to a first embodiment of the present disclosure will be described below.

Figure 2:
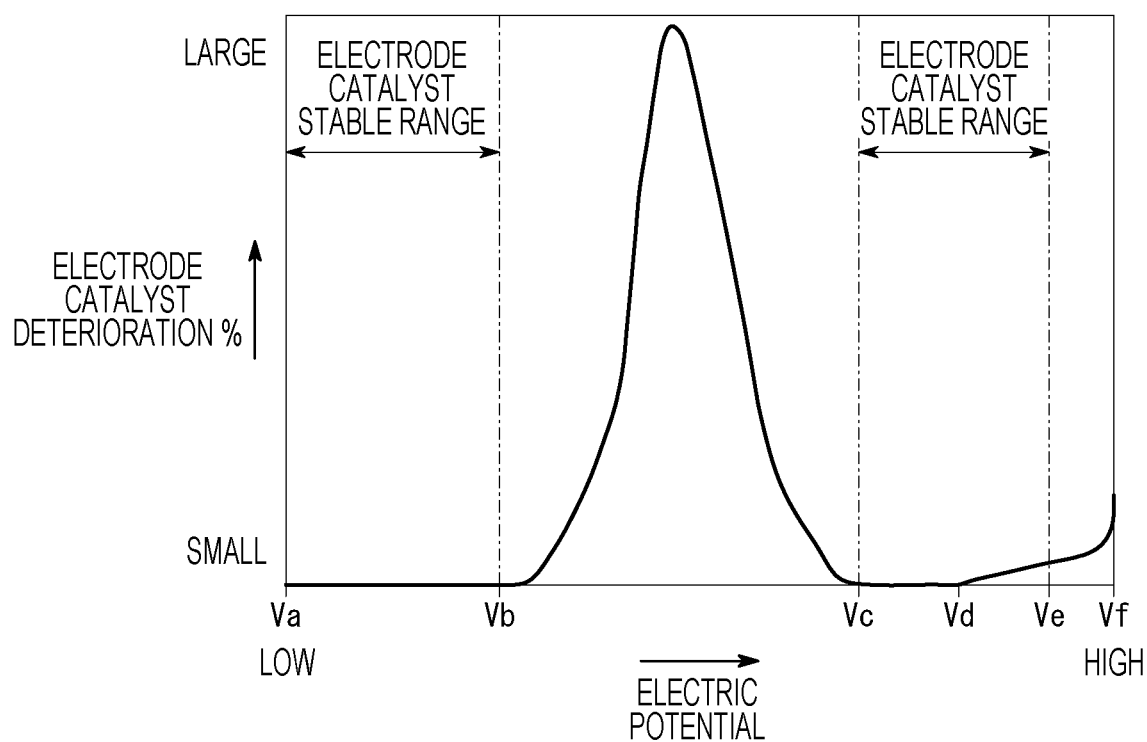
FIG. 2 illustrates the relationship between the output electric potential of a power generation cell of a fuel cell stack and deterioration of an electrode catalyst.

FIG. 2 illustrates the relationship between the percentage of deterioration of an electrode catalyst of the power generation cell 28 and the electric potential (cell voltage). The region between an electric potential Va (for example, 0.65 V) and an electric potential Vb (for example, 0.7 V), which are low electric potentials, is a reduction region in which a reduction reaction of platinum included in the electrode catalyst occurs. When the power generation cell 28 generates electric power at an electric potential in this region, the electrode catalyst is stable.

The region between the electric potential Vb and an electric potential Vc (for example, 0.79 V) is a region in which a platinum oxidation-reduction reaction, in which oxidation and reduction of platinum alternate, occurs. This is a region in which the electrode catalyst is instable because platinum dissolves considerably, that is, a deterioration acceleration region. The deterioration acceleration region is a voltage region in which deterioration of the power generation cell 28 is accelerated due to the platinum oxidation-reduction reaction. In the deterioration acceleration region, control in a deterioration suppressing mode is performed as described below.

The region between the electric potential Vc to an electric potential Vd (for example, 0.9 V) is a region in which an oxidation reaction of platinum occurs. In this region, the electrode catalyst is stable. The voltage region between the electric potential Vc and the electric potential Vd is a voltage region that is most suitable for power generation.

The region between the electric potential Vd and an electric potential Ve (for example, 0.95 V), which are comparatively high electric potentials, is a region in which oxidation of platinum occurs. In this region, the electrode catalyst is comparatively stable. The region between the electric potential Ve and an electric potential Vf (open circuit electric potential (OCV)) is a region in which oxidation of platinum occurs. However, deterioration occurs due to high electric potential. During normal power generation, power generation conditions are controlled so as to decrease the frequency of using the region between the electric potential Vb and the electric potential Vc.

Figure 3:
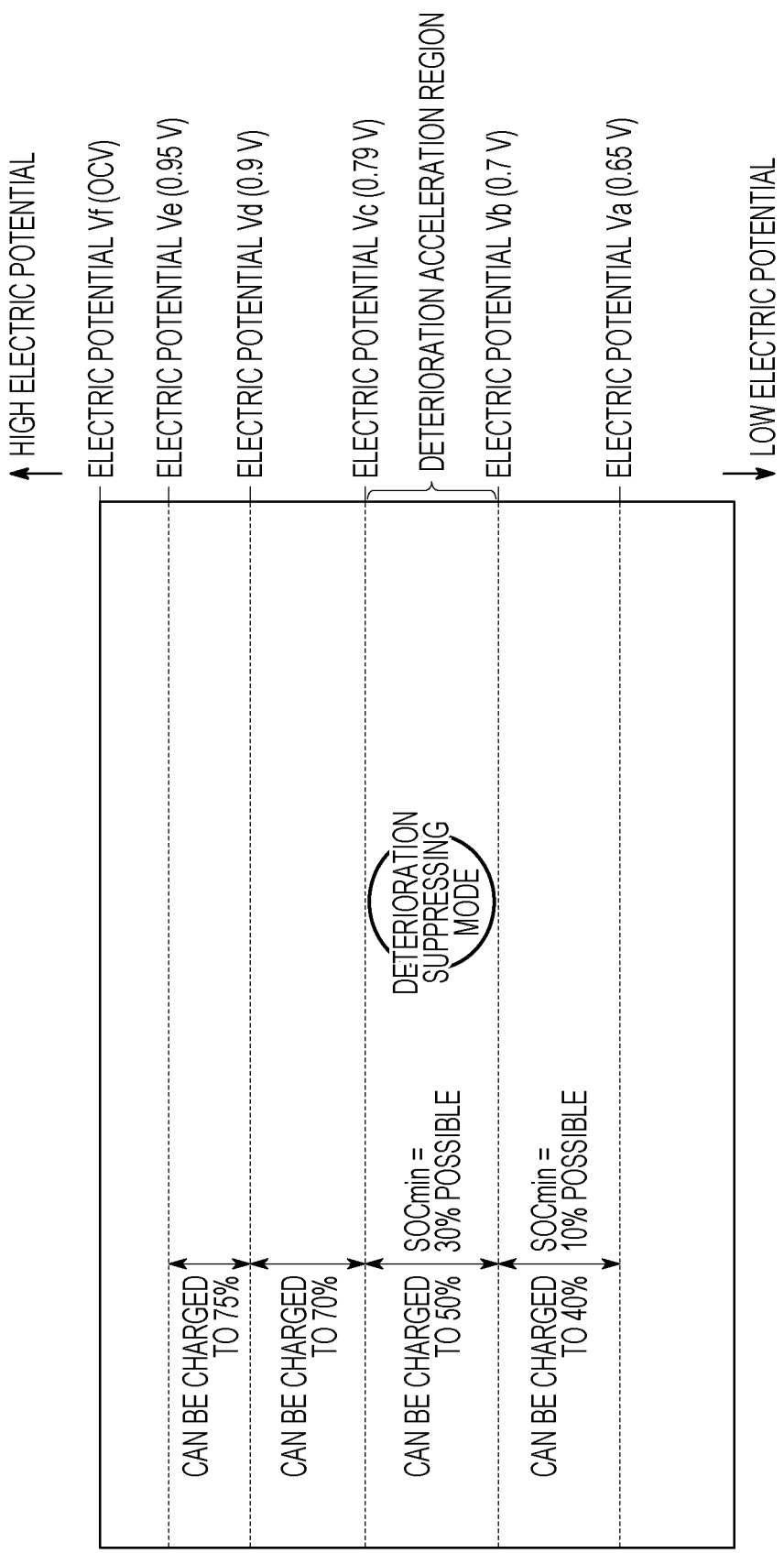
FIG. 3 illustrates the relationship between the electric potential of the power generation cell and the SOC of a battery.

FIG. 3 illustrates the use conditions of the battery 14 in accordance with the electric potential regions. Basically, as the electric potential decreases (as the electric power increases), the state-of-charge (SOC) of the battery 14 decreases. To be specific, between the electric potential Ve and the electric potential Vd, which are high electric potentials, the battery 14 can be charged to a SOC of 75%.

Between the electric potential Vc and the electric potential Vd, the battery 14 can be charged to, for example, a SOC of 70%. Between the electric potential Vb to the electric potential Vc, the battery 14 can be charged to, for example, a SOC of 50%. Between the electric potential Va and the electric potential Vb, the battery 14 can be charged to, for example, a SOC of 40%. Between the electric potential Vb and the electric potential Vc, electric power can be output to a minimum SOC (SOCmin) of, for example, 30%. Between the electric potential Va and the electric potential Vb, electric power can be output to a minimum SOC (SOCmin) of, for example, 10%.

Figure 4:
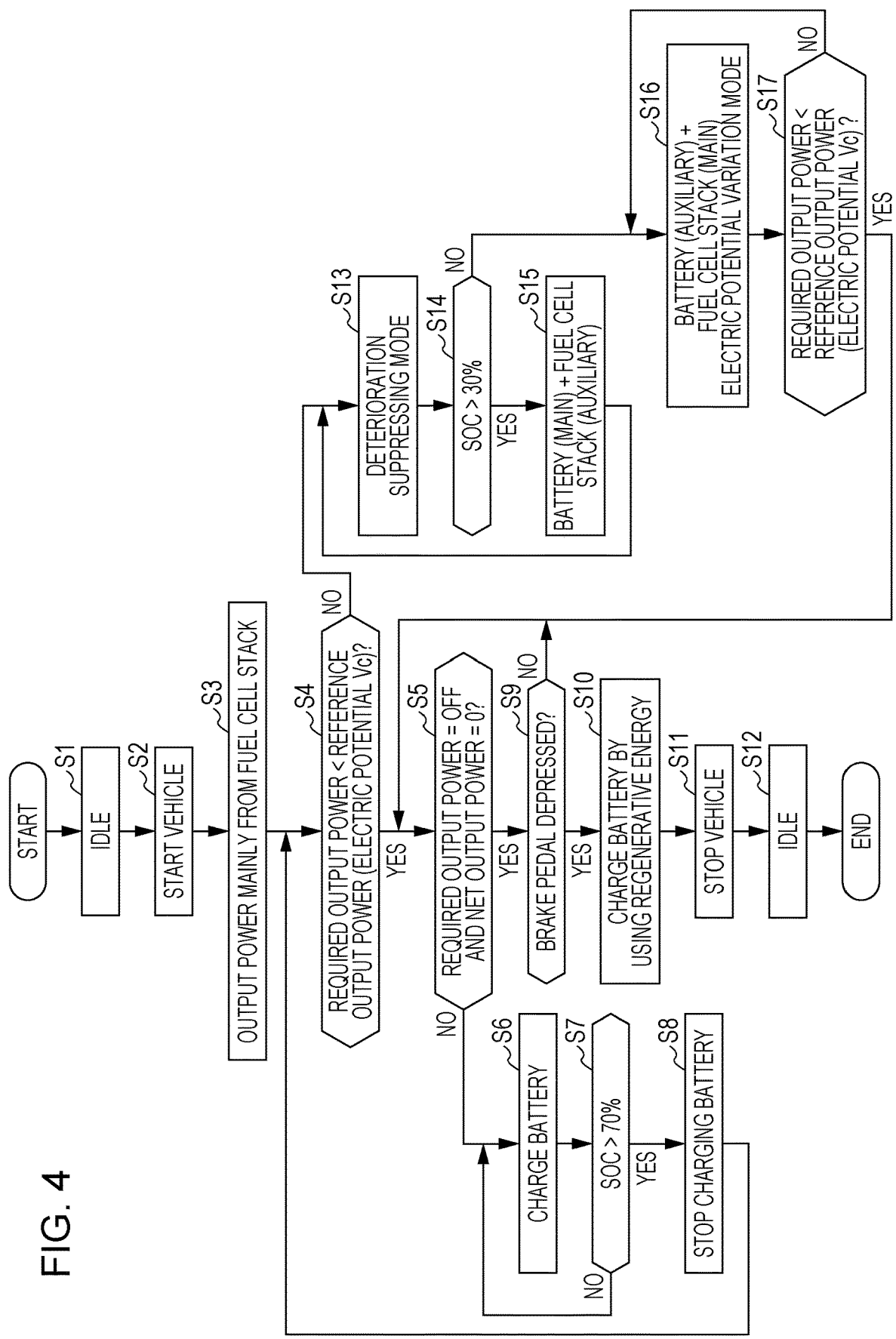
FIG. 4 is a flowchart of an operation method according to a first embodiment.

Next, referring to the flowchart shown in FIG. 4, an operation method performed by the controller 26 will be described below.

First, the fuel cell vehicle 10 is in an idling state (stopped state) (step S1). A driver starts the fuel cell vehicle 10 by, for example, depressing an accelerator pedal (not shown) (step S2). When starting the vehicle from the idling state, power is mainly output from the fuel cell stack 18 (step S3).

Figure 5:
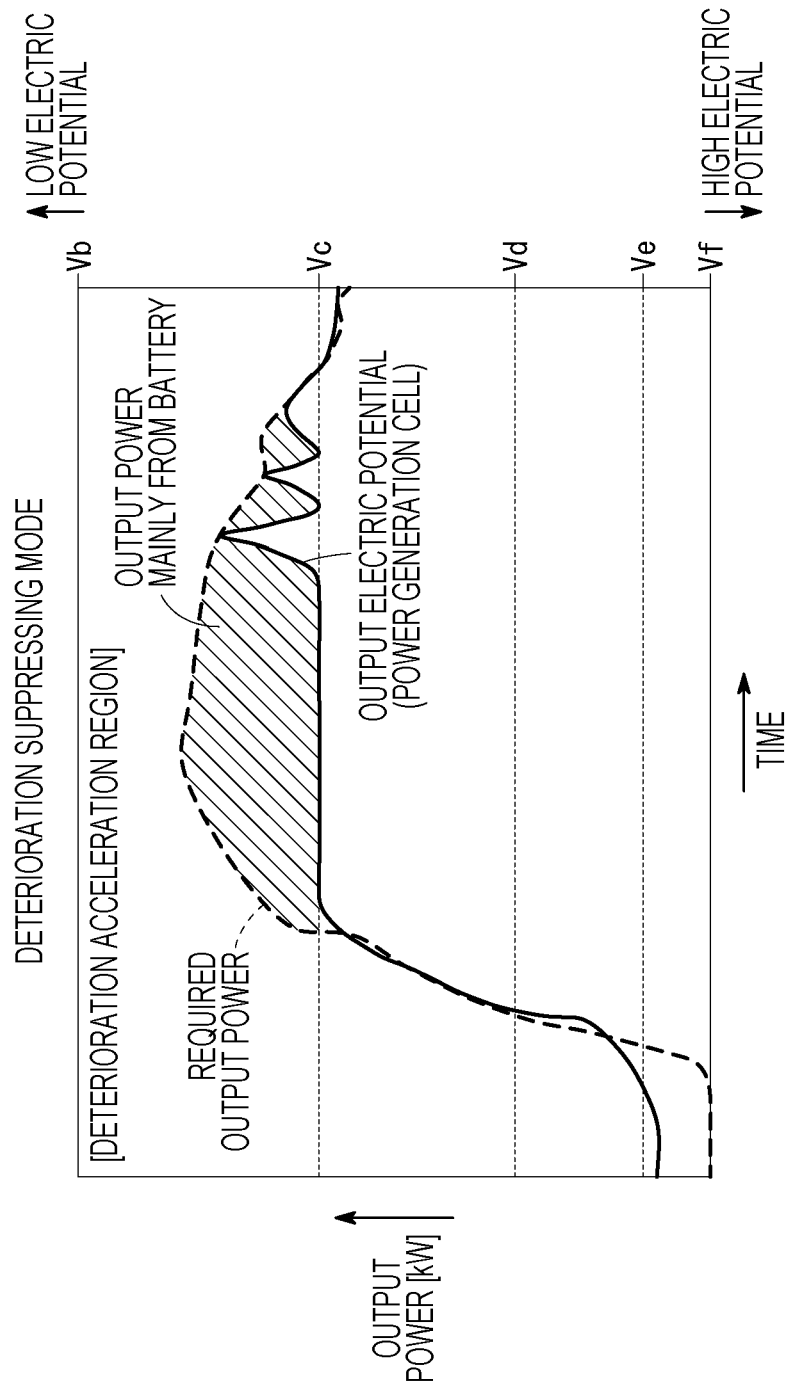
FIG. 5 is a time chart of the operation method.

Therefore, electric power is supplied from the fuel cell stack 18 to auxiliary machinery to drive the auxiliary machinery, and each power generation cell 28 is not in an OCV state. Referring to FIG. 5, the electric potential of the power generation cell 28 is maintained near the electric potential Ve, and the NET output power is 0.

In step S4, whether or not the required output power (electric power) of the fuel cell stack 18 is lower than reference output power (electric power when the electric potential is Vc) is determined. If it is determined that the required output power of the fuel cell stack 18 is lower than the reference output power (YES in step S4), that is, the output electric potential of the power generation cell 28 has a value (in the electrode catalyst stable range) higher than the electric potential Vc (operation region with a medium load), the process proceeds to step S5.

In step S5, whether or not the required output power of the fuel cell stack 18 from the fuel cell vehicle 10 is off and the NET output power is 0 is determined. If it is determined that the required output power of the fuel cell stack 18 from the fuel cell vehicle 10 is not off or the NET output power is not 0 (NO in step S5), the process proceeds to step S6, and charging of the battery 14 by using the fuel cell stack 18 and supply of electric power to the fuel cell vehicle 10 are performed. Then, if it is determined that the SOC of the battery 14 is higher than, for example, 70% (YES in step S7), the process proceeds to step S8, and charging of the battery 14 is stopped. Then, the process returns to step S4.

If it is determined in step S5 that the required output power of the fuel cell stack 18 from the fuel cell vehicle 10 is off and the NET output power is 0 (YES in step S5), the process proceeds to step S9. In step S9, whether or not the brake pedal (not shown) is depressed by the driver is determined. If it is determined that the brake pedal is depressed (YES in step S9), the process proceeds to step S10, and the battery 14 is charged by using regenerative energy. Moreover, the fuel cell vehicle 10 is stopped (step S11). When the fuel cell vehicle 10 enters an idling state (step S12), the operation control is stopped.

If it is determined in step S4 that the required output power of the fuel cell stack 18 is higher than or equal to the reference output power (NO in step S4), that is, the output electric potential of the power generation cell 28 has a value (in the deterioration acceleration region) lower than or equal to the electric potential Vc, the process proceeds to a deterioration suppressing mode in step S13. In the deterioration suppressing mode, first, if it is determined that the SOC of the battery 14 is higher than, for example, 30% (YES in step S14), the process proceeds to step S15, and electric power is mainly supplied from the battery 14 and the remaining electric power is supplied from the fuel cell.

Therefore, referring to FIG. 5, the output power of the fuel cell stack 18 is maintained at a constant value, and thereby the output electric potential of the power generation cell 28 is maintained near the electric potential Vc. At this time, a shortfall in electric power is supplied from the battery 14. If the SOC of the battery 14 becomes lower than or equal to 30% (NO in step S14), the process proceeds to step S16, electric power is supplied mainly from the fuel cell stack 18, and the fuel cell stack 18 enters an electric potential variation mode.

Referring to FIG. 5, in the electric potential variation mode, electric power output from the fuel cell stack 18 is periodically increased so as to become closer to the required output power. The variation in output power is performed with intervals of 0.1 seconds to 15 seconds.

Next, if it is determined that the required output power of the fuel cell stack 18 is lower than the reference output power (YES in step S17), the deterioration suppressing mode is finished, and the process proceeds to S5 and the following steps, which are described above.

In the first embodiment, the output power (electric power), that is, the output electric potential of the power generation cell 28 is varied when the output electric potential of the power generation cell 28 enters a region between the electric potential Vb (for example, 0.7 V) and the electric potential Vc (for example, 0.79 V), which is the deterioration acceleration region. Accordingly, the electrode catalyst is maintained in an oxidation state, and therefore dissolving of the electrode catalyst can be easily and reliably suppressed by performing simple control. Thus, an advantageous effect is obtained in that deterioration of the power generation cell 28 can be effectively reduced.

Moreover, referring to FIG. 5, the output electric potential of the power generation cell 28 is maintained at a constant value (electric potential Vc) when the output electric potential of the power generation cell 28 reaches a predetermined value (for example, electric potential Vc) by supplying electric power from the fuel cell stack 18 and the battery 14 to the motor 16. If the SOC of the battery 14 becomes lower than a predetermined value (for example, 30%), the output electric potential of the power generation cell 28 is periodically varied. Therefore, deterioration of the power generation cell 28 can be reliably suppressed.

Figure 6:
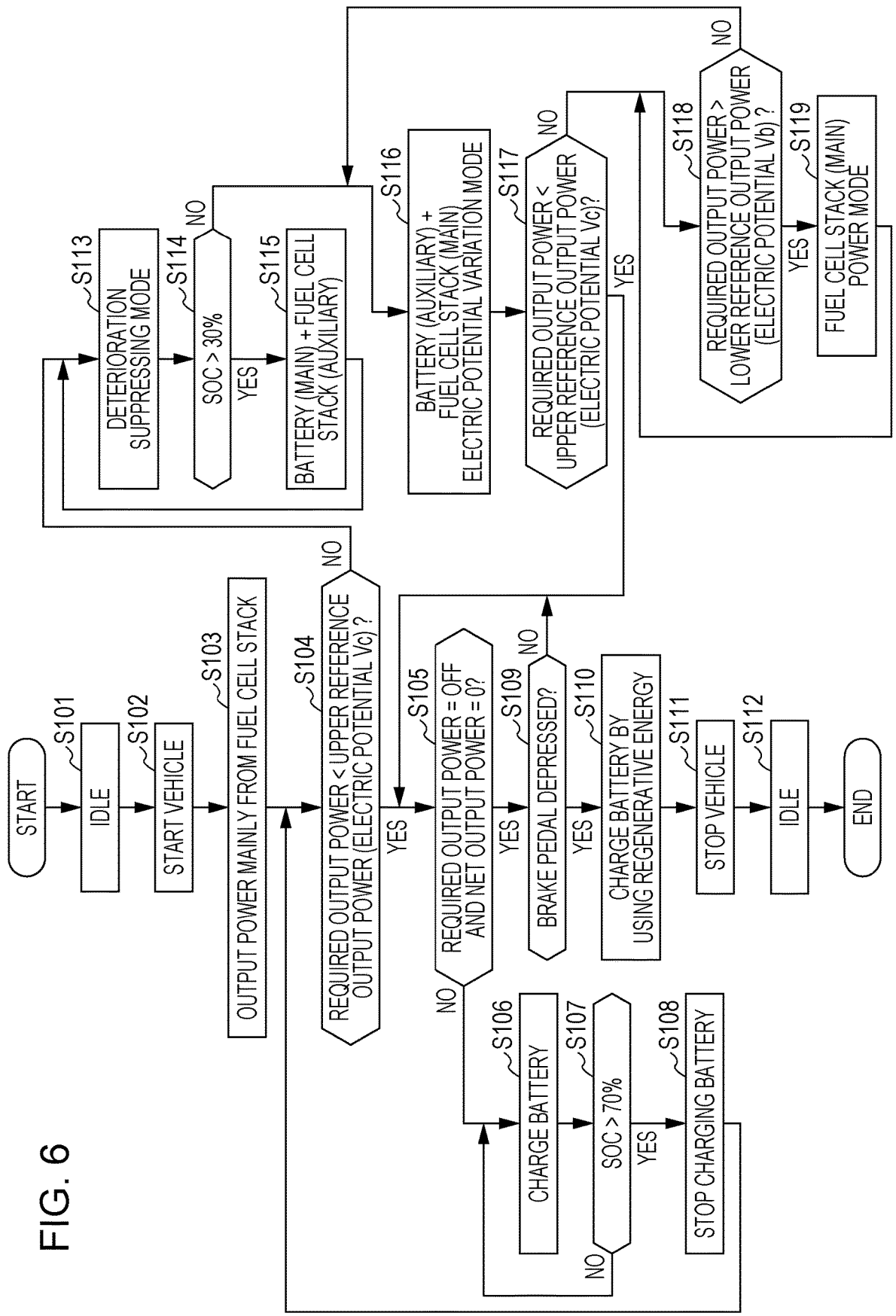
FIG. 6 is a flowchart of an operation method according to a second embodiment.

FIG. 6 is a flowchart of an operation method according to a second embodiment of the present disclosure. Detailed descriptions of steps that are the same as those of the flowchart (see FIG. 4) of the operation method according to the first embodiment will be omitted.

In the first embodiment, in particular, the operation region with a medium load (between the electric potential Vb and the electric potential Vc) is mainly described. In the second embodiment, an operation region with a high load (between the electric potential Va and the electric potential Vb), which is used when operating the fuel cell vehicle 10 on an expressway or the like, will be mainly described.

In the fuel cell vehicle 10, when the required output power of the fuel cell stack 18 is lower than upper reference output power (electric power when the electric potential is Vc), power is mainly output from the fuel cell stack 18 and charging of the battery 14 is performed (steps S101 to S108). Moreover, the fuel cell vehicle 10 is stopped through steps S109 to S112.

If the required output power of the fuel cell stack 18 is higher than or equal to the upper reference output power (electric potential Vc), the process enters a deterioration suppressing mode (step S113). In the deterioration suppressing mode, if the SOC of the battery 14 is higher than 30%, electric power is mainly supplied from the battery 14 (step S114 and step S115). If the SOC of the battery 14 becomes lower than or equal to 30%, electric power is supplied mainly from the fuel cell stack 18, and the fuel cell stack 18 enters an electric potential variation mode (step S116).

In the electric potential variation mode, if it is determined that the required output power of the fuel cell stack 18 is higher than the upper reference output power (electric power when the electric potential is Vc) (NO in step S117), the process proceeds to step S118. If it is determined in step S118 that the required output power of the fuel cell stack 18 is higher than lower reference output power (electric power when the electric potential is Vb) (YES in step S118), that is, the output electric potential of the power generation cell 28 has a value (in the electrode catalyst stable range) lower than the electric potential Vb, the process proceeds to step S119.

In step S119, the fuel cell vehicle 10 is being driven in a high driving load region, such as an expressway. Power is output mainly from the fuel cell stack 18, so that the fuel cell vehicle 10 is operated in a power mode.

If it is determined that the required output power of the fuel cell stack 18 is lower than the lower reference output power (electric power when the electric potential is Vb) (NO in step S118), that is, the output electric potential of the power generation cell 28 is higher than the electric potential Vb (in the deterioration acceleration region), the process returns to step S116. In step S116, the electric potential variation mode is performed near the electric potential Vb.

In the second embodiment, in particular, in the operation region with a high load, the process enters the electric potential variation mode when the output electric potential of the power generation cell 28 is near the electric potential Vb. In the electric potential variation mode, electric power output from the fuel cell stack 18 is periodically increased so as to become closer to the required output power. Accordingly, the second embodiment has the same advantageous effects as the first embodiment, such as dissolving of the electrode catalyst can be easily and reliably suppressed by performing simple control and deterioration of the power generation cell 28 can be effectively reduced.

Figure 7:
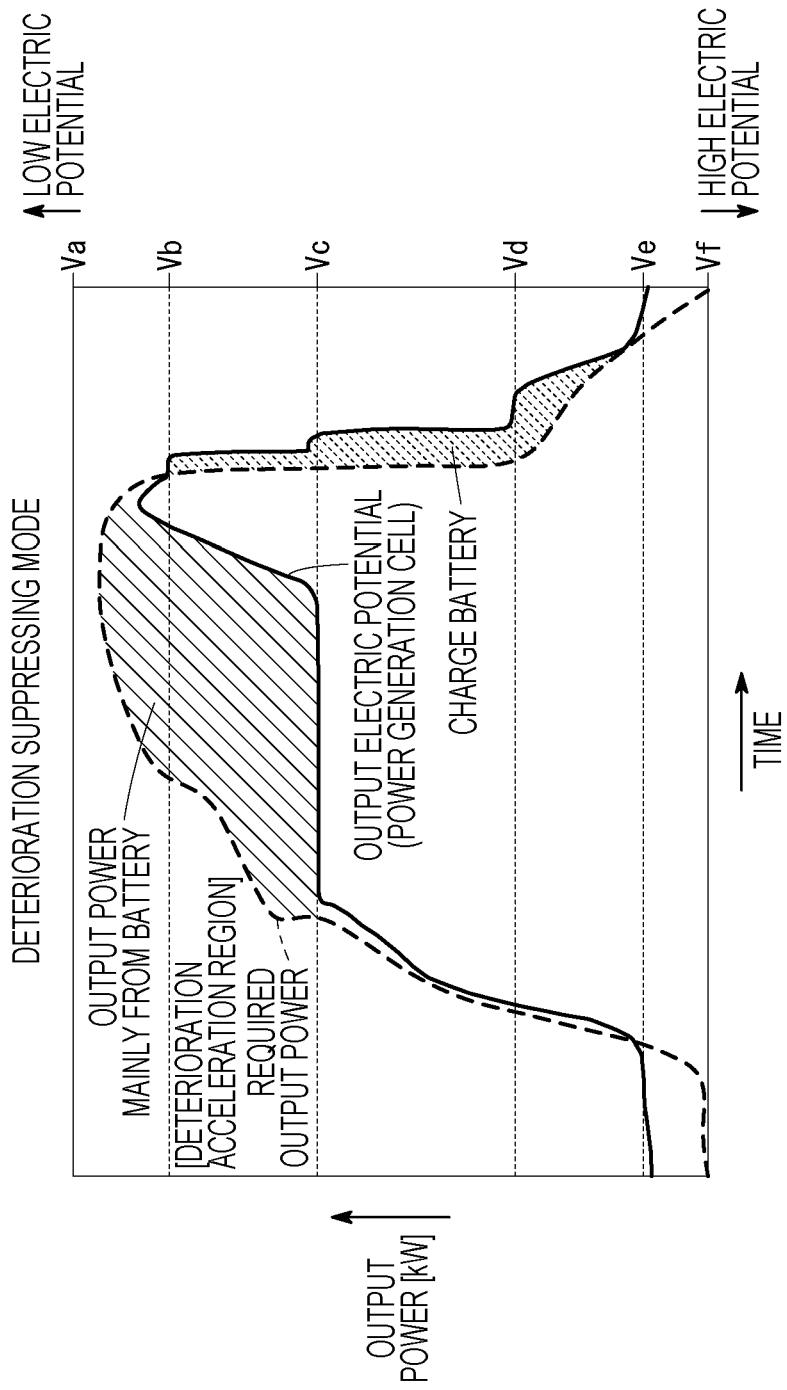
FIG. 7 is a flowchart of an operation method according to a third embodiment.

FIG. 7 is a time chart of an operation method according to a third embodiment of the present disclosure.

Even when the fuel cell vehicle 10 is in an idling state, power is output from the fuel cell stack 18 and the auxiliary machinery is driven by supplying electric power to the auxiliary machinery. When the fuel cell vehicle 10 accelerates, electric power output from the fuel cell stack 18 increases, and the output electric potential of the power generation cell 28 decreases from the electric potential Ve (high electric potential) to the electric potential Vd and further toward the electric potential Vc (low electric potential).

The region between the electric potential Vc and the electric potential Vb is the deterioration acceleration region, and, before entering the deterioration acceleration region, electric power output from the fuel cell stack 18 is maintained at constant output power. Thus, the output electric potential of the power generation cell 28 is maintained near the electric potential Vc. At this time, electric power is output from the battery 14, and thereby electric power can be supplied in accordance with the required output power. That is, electric power is supplied mainly from the battery 14.

Then, when the SOC of the battery 14 becomes lower than a predetermined value, the process enters the power mode (between the electric potential Vb and the electric potential Va) and control is performed so that power is output from the fuel cell stack 18. Here, if the output power of the fuel cell stack 18 has a margin, the battery 14 is charged to an SOC of 40%.

Next, when the output power becomes unnecessary, electric power extracted from the fuel cell stack 18 is decreased. When the electric power extracted from the fuel cell stack 18 decreases, the output electric potential of the power generation cell 28 increases. Before the output electric potential of the power generation cell 28 reaches the electric potential Vb, the output electric potential of the power generation cell 28 is maintained at a constant electric potential (near the electric potential Vb) for, for example, 0.1 seconds to 10 seconds. During this time, the battery 14 is charged.

When the electric power extracted from the fuel cell stack 18 decreases further and before the output electric potential of the power generation cell 28 reaches the electric potential Vc, the output electric potential of the power generation cell 28 is maintained at a constant electric potential (near the electric potential Vc) for, for example, 0.1 seconds to 10 seconds. During this time, the battery 14 is charged. Next, when the electric power extracted from the fuel cell stack 18 decreases and before the output electric potential of the power generation cell 28 reaches the electric potential Vd, the output electric potential of the power generation cell 28 is maintained at a constant electric potential (near the electric potential Vd) for, for example, 0.1 seconds to 10 seconds. During this time, the battery 14 is charged.

As described above, in the third embodiment, when decreasing the electric power extracted from the fuel cell stack 18, the output electric potential of the power generation cell 28 is maintained at a constant value near the upper limit (electric potential Vc) of the deterioration acceleration region for a certain time and at a constant value near the lower limit (electric potential Vb) of the deterioration acceleration region for a certain time, and, as necessary, at a constant value near the electric potential Vd for a certain time. Control of maintaining the output electric potential of the power generation cell 28 at a constant value for a certain time can be used not only when decreasing the electric power extracted from the fuel cell stack 18 but also when increasing the electric power extracted from the fuel cell stack 18. That is, the control can be used when increasing or decreasing the electric power extracted from the fuel cell stack 18.

Accordingly, with the power generation cell 28, sharp variation in the output electric potential between the upper and lower limits of the deterioration acceleration region is prevented, and therefore dissolving of the electrode catalyst can be reliably suppressed by performing simple control. Thus, the third embodiment provides advantageous effects the same as those of the first and second embodiment, such as deterioration of an electrode catalyst can be reduced.

An aspect of the present disclosure provides a method for operating a fuel cell vehicle including a vehicle drive motor to which electric power is supplied from a fuel cell and a battery. The method includes controlling electric power extracted from the fuel cell when an output electric potential of the fuel cell enters a deterioration acceleration region in a state in which electric power is supplied from the fuel cell and the battery to the vehicle drive motor. Here, the deterioration acceleration region is a voltage region in which deterioration of the fuel cell is accelerated due to a platinum oxidation-reduction reaction.

In the method, preferably, controlling of the electric power includes a step of maintaining the output electric potential of the fuel cell at a constant value when the output electric potential of the fuel cell reaches a predetermined value by supplying electric power from the fuel cell and the battery to the vehicle drive motor, and a step of varying the electric power extracted from the fuel when a state-of-charge of the battery becomes lower than a predetermined value.

Another aspect of the present disclosure provides a method for operating a fuel cell vehicle, the method including maintaining an output electric potential of the fuel cell at a constant value near an upper limit of a deterioration acceleration region and at a constant value near a lower limit of the deterioration acceleration region when increasing or decreasing electric power extracted the fuel cell in a state in which electric power is supplied from the fuel cell and the battery to a vehicle drive motor. Here, the deterioration acceleration region is a voltage region in which deterioration of the fuel cell is accelerated due to a platinum oxidation-reduction reaction.

With the present disclosure, electric power extracted from the fuel cell is controlled when the output electric potential of the fuel cell enters a deterioration acceleration region. Accordingly, the electrode catalyst is maintained in an oxidation state, and therefore dissolving of the electrode catalyst can be suppressed easily and reliably by performing simple control. As a result, deterioration of the electrode catalyst can be reduced.

With the present disclosure, when increasing or decreasing electric power extracted from the fuel cell, the output electric potential of the fuel cell is maintained at a constant value near the upper limit and at a constant value near the lower limit of the deterioration acceleration region. Accordingly, sharp variation in the electric potential near the upper and lower limits of the deterioration acceleration region is prevented, and therefore dissolving of the electrode catalyst can be reliably suppressed by performing simple control and deterioration of the electrode catalyst can be reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A method for operating a fuel cell vehicle including a vehicle drive motor to which electric power is supplied from a fuel cell and a battery, the method comprising:
controlling electric power extracted from the fuel cell when an output electric potential of the fuel cell enters a deterioration acceleration region in a state in which electric power is supplied from the fuel cell and the battery to the vehicle drive motor, the deterioration acceleration region being a voltage region in which deterioration of the fuel cell is accelerated due to a platinum oxidation-reduction reaction,
wherein controlling of the electric power includes
a step of varying the electric power extracted from the fuel cell when a state-of-charge of the battery becomes lower than a predetermined value, the step of varying electric power extracted from the fuel cell including periodically varying between a constant value at a boundary of the deterioration acceleration region and a required output power of the vehicle drive motor within the deterioration acceleration region.

2. The method according to claim 1,
wherein controlling of the electric power further includes
a step of maintaining the output electric potential of the fuel cell at the constant value when the output electric potential of the fuel cell reaches the predetermined value by supplying electric power from the fuel cell and the battery to the vehicle drive motor.

3. A method for operating a fuel cell vehicle including a vehicle drive motor to which electric power is supplied from a fuel cell and a battery, the method comprising:
   maintaining an output electric potential of the fuel cell at a constant value near an upper limit of a deterioration acceleration region or at a constant value near a lower limit of the deterioration acceleration region when increasing or decreasing electric power extracted from the fuel cell in a state in which electric power is supplied from the fuel cell and the battery to the vehicle drive motor, the deterioration acceleration region being a voltage region in which deterioration of the fuel cell is accelerated due to a platinum oxidation-reduction reaction; and
   varying the electric power extracted from the fuel cell when a state-of-charge of the battery becomes lower than a predetermined value, the varying of the electric power extracted from the fuel cell including periodically varying between the constant value near the upper limit of the deterioration acceleration region and a required output power of the vehicle drive motor within the deterioration acceleration region.

4. A method for operating a fuel cell vehicle, comprising:
   supplying electric power to a vehicle drive motor from at least one of a fuel cell or a battery;
   determining whether an electric potential of electric power output from the fuel cell is within a deterioration acceleration region in which the fuel cell is deteriorated due to a platinum oxidation-reduction reaction; and
   controlling the fuel cell in a deterioration suppressing mode when the electric potential is within the deterioration acceleration region in a state where the fuel cell and the battery supply electric power to the vehicle drive motor,
   wherein controlling the fuel cell in the deterioration suppressing mode includes
       varying electric power extracted from the fuel cell when a state-of-charge of the battery becomes lower than a predetermined value, the varying of the electric power extracted from the fuel cell including periodically varying between a constant value at a boundary of the deterioration acceleration region and a required output power of the vehicle drive motor within the deterioration acceleration region.

5. The method according to claim 4,
   wherein controlling the fuel cell in the deterioration suppressing mode further includes
       maintaining the electric potential at the constant value when the electric potential reaches the predetermined value by supplying electric power from the fuel cell and the battery to the vehicle drive motor.

6. A method for operating a fuel cell vehicle, comprising:
   supplying electric power to a vehicle drive motor from at least one of a fuel cell or a battery;
   maintaining an electric potential of electric power output from the fuel cell at a constant value near an upper limit of a deterioration acceleration region or at a constant value near a lower limit of the deterioration acceleration region when changing electric power output from the fuel cell in a state where the fuel cell and the battery supply electric power to the vehicle drive motor, the deterioration acceleration region being a voltage region in which the fuel cell is deteriorated due to a platinum oxidation-reduction reaction; and
   varying the electric power extracted from the fuel cell when a state-of-charge of the battery becomes lower than a predetermined value, the varying of the electric power extracted from the fuel cell including periodically varying between the constant value near the upper limit of the deterioration acceleration region and a required output power of the vehicle drive motor within the deterioration acceleration region.

* * * * *